(12) United States Patent
Kim

(10) Patent No.: US 11,432,098 B2
(45) Date of Patent: Aug. 30, 2022

(54) VEHICLE AND METHOD FOR CONTROLLING THEREOF

(71) Applicants: Hyundai Motor Company, Seoul (KR); Kia Motors Corporation, Seoul (KR)

(72) Inventor: Youngbeom Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 17/027,867

(22) Filed: Sep. 22, 2020

(65) Prior Publication Data

US 2021/0306788 A1 Sep. 30, 2021

(30) Foreign Application Priority Data

Mar. 27, 2020 (KR) .................. 10-2020-0037706

(51) Int. Cl.
*H04S 7/00* (2006.01)
*B60N 2/879* (2018.01)
*H04R 1/02* (2006.01)

(52) U.S. Cl.
CPC .............. *H04S 7/303* (2013.01); *B60N 2/879* (2018.02); *H04R 1/025* (2013.01)

(58) Field of Classification Search
CPC ..... H04R 5/023; H04R 2499/13; H04S 7/303; B60R 11/0217; G06F 3/013
USPC .......................... 381/86, 301, 302, 365, 389
See application file for complete search history.

(56) References Cited

U.S. PATENT DOCUMENTS

| | | | | |
|---|---|---|---|---|
| 2008/0130922 A1* | 6/2008 | Shibata | .................. | H04R 5/023 381/1 |
| 2015/0049887 A1* | 2/2015 | Bleacher | ................. | H04S 7/302 381/302 |
| 2017/0330042 A1* | 11/2017 | Vaziri | .................... | H04N 5/332 |

* cited by examiner

*Primary Examiner* — William A Jerez Lora
(74) *Attorney, Agent, or Firm* — Fox Rothschild LLP

(57) ABSTRACT

A vehicle is provided to minimize the difference in left and right output intensity of a headrest speaker by adjusting an output intensity of based on the position of the passenger's ear. The headrest includes a left-side speaker provided on the left-side of the headrest of a seat inside the vehicle to output sound and a right-side speaker provided on the right-side of the headrest to output sound. A pressure sensor measures a force applied to the headrest and a controller adjusts the output intensity of the left speaker and the right speaker based on an action point of the force measured by the pressure sensor.

17 Claims, 9 Drawing Sheets

300:301~304
600:601~604
600L:601L~604L
600R:601R~604R

RIGHT SIDE ⟵⟶ LEFT SIDE

RIGHT SIDE ⟵⟶ LEFT SIDE

VEHICLE AND METHOD FOR CONTROLLING THEREOF

CROSS-REFERENCE TO RELATED APPLICATION(S)

The present application claims priority to Korean Patent Application No 10-2020-0037706, filed on Mar. 27, 2020, the entire contents of which is incorporated herein for all purposes by this reference.

BACKGROUND

Field of the Disclosure

The present disclosure relates to a vehicle and a control method thereof, and more particularly, to a vehicle and a control method in which an output intensity of a headrest speaker provided inside the vehicle is automatically changed according to the position of the passenger's ear.

Description of Related Art

A vehicle is a device capable of transporting people or objects toward a destination while driving on a road or track. The vehicle may be moved to various positions mainly using one or more wheels installed on the vehicle body. Such a vehicle may include a three-wheeled or four-wheeled vehicle, a two-wheeled vehicle such as a motorcycle, a construction machine, a bicycle, and a train running on a rail disposed on a track.

In addition, the vehicle performs a navigation function, a telephone function, an audio function, a radio function, a broadcast function, a text message service function, an internet function, etc., and recently, software for performing more various and complex functions are built-in together. The demand level of the driver or passenger in the vehicle is increasing, and to comply with this, the level of interlocking technology between the vehicle and an external terminal such as a smart phone is also increasing.

The driver or passenger of the vehicle may desire to listen to desired music through interworking with the vehicle's audio video navigation (AVN) device or an external terminal, and the desire to listen to music may be different between the driver and passenger. In addition, when making a call using a Bluetooth connection inside the vehicle, others within the vehicle may also hear the content of the call, and thus personal privacy is infringed.

Furthermore, as various technologies related to vehicles are developed, various sounds such as a warning sound, a navigation guide sound, and a beep sound may be output into the vehicle, and a driver or a passenger may also need to listen to unnecessary sounds. Accordingly, in recent years, research has been conducted into a technology for separating the sound output area or the sound arrival area so that only the passengers located in a predetermined area hear sounds output to the inside of the vehicle, such as music or call sounds, by distinguishing the area inside the vehicle. Furthermore, discussions are being actively conducted on a method of separating the sound output region and simultaneously outputting sound to the separated region.

Research into headrest speakers is actively underway as a method for separating the sound output area, when the headrest speaker is used, there is a problem that the distance between the passenger's ear and the speaker changes when the head of the passenger moves, resulting in a difference in left and right volume.

SUMMARY

The present disclosure provides a vehicle and a control method thereof for minimizing the difference in left and right volume felt by a passenger by adjusting the output intensity of the headrest speaker based on the position of the passenger's ear.

In accordance with an aspect of the present disclosure, a vehicle may include a headrest speaker having a left-side speaker provided on the left-side of the headrest of a seat inside the vehicle to output sound and a right-side speaker provided on the right-side of the headrest to output sound; a pressure sensor configured to measure a force applied to the headrest; and a controller configured to adjust an output intensity of the left speaker and the right speaker based on an action point of the force measured by the pressure sensor.

The controller may be configured to reduce the output intensity of the speaker provided in a first direction among the left speaker and the right speaker, and increase the output intensity of the speaker provided in a second direction opposite to the first direction among the left speaker and the right speaker when the action point of the force measured by the pressure sensor is located in the first direction based on a vertical line passing through a center of the headrest. The controller may be configured to determine an amount of change in the output intensity of the left speaker or the right speaker in proportion to a distance between the action point of the force measured by the pressure sensor and the vertical line passing through the center of the headrest.

The vehicle may further include a vibration sensor configured to detect a vibration of the seat; and the controller may be configured to calibrate a position of the action point measured by the pressure sensor based on a horizontal vibration among the vibrations detected by the vibration sensor. Additionally, the controller may be configured to calibrate the position of the action point of the force measured by the pressure sensor in the left direction when a vibration direction detected by the vibration sensor is in the left direction, and may be configured to calibrate the position of the action point of the force measured by the pressure sensor in the right direction when a vibration direction detected by the vibration sensor is in the right direction.

The controller may be configured to calibrate the position of the action point of the force measured by the pressure sensor to the center of the headrest when the vibration sensor continuously detects the vibration in the horizontal direction for a predetermined time. The controller may be configured to turn off the output of the headrest speaker when the position of the action point of the force measured by the pressure sensor does not change for the predetermined time.

In accordance with an aspect of the present disclosure, a vehicle may include a headrest speaker having a left-side speaker provided on the left-side of the headrest of a seat inside the vehicle to output sound and a right-side speaker provided on the right-side of the headrest to output sound; a camera configured to acquire an image of a passenger sitting in the seat; and a controller configured to determine a position of the passenger's ear based on the image acquired from the camera, and adjust an output intensity of the left speaker and the right speaker based on the position of the passenger's ear.

The controller may be configured to reduce the output intensity of the speaker when the left or right ear of the passenger is closer to the left speaker or the right speaker, and increase the output intensity of the speaker when the left or right ear of the passenger is farther from the left speaker or the right speaker. The controller may be configured to determine the output intensity of the left speaker or the right speaker in proportion to a distance between the left or right ear of the passenger and the left speaker or the right speaker.

The vehicle may further include a vibration sensor configured to detect a vibration of the seat; and the controller may be configured to calibrate a position of the passenger's ear based on a horizontal vibration among the vibrations detected by the vibration sensor. The controller may be configured to calibrate the position of the passenger's ear in the left direction when a vibration direction detected by the vibration sensor is in the left direction, and calibrate the position of the passenger's ear in the right direction when a vibration direction detected by the vibration sensor is in the right direction.

The controller may be configured to calibrate the position of the passenger's ear so that the distance between the right speaker and the passenger's right ear is equal to the distance between the left speaker and the passenger's left ear when the horizontal vibration is continuously detected by the vibration sensor for a preset time. The controller may be configured to detect the passenger's eye based on the image of the passenger, and turn off the output of the headrest speaker when the passenger's eye is closed for a predetermined period of time.

In accordance with an aspect of the present disclosure, a controlling method of a vehicle including a headrest speaker having a left-side speaker provided on the left-side of the headrest of a seat inside the vehicle to output sound and a right-side speaker provided on the right-side of the headrest to output sound, the method may include: determining a position of an ear of a passenger sitting in the seat; and adjusting an output intensity of the left speaker and the right speaker based on the position of the passenger's ear.

The determining of the position of the ear of the passenger may include: determining the position of the passenger's ear sitting in the seat based on an action point of force measured by a pressure sensor configured to measure force applied to the headrest. The adjusting of the output intensity of the left speaker and the right speaker based on the position of the passenger's ear may include: reducing the output intensity of the speaker provided in a first direction among the left speaker and the right speaker, and increasing the output intensity of the speaker provided in a second direction opposite to the first direction among the left speaker and the right speaker when the action point of the force measured by the pressure sensor is located in the first direction based on a vertical line passing through a center of the headrest.

The determining of the position of the ear of the passenger sitting in the seat may include determining the position of the ear of the passenger based on the image acquired by a camera configured to acquire image of the passenger sitting in the seat; and the adjusting of the output intensity of the left speaker and the right speaker based on the position of the ear of the passenger may include: reducing the output intensity of the speaker when the left or right ear of the passenger is closer to the left speaker or the right speaker, and increasing the output intensity of the speaker when the left or right ear of the passenger is farther from the left speaker or the right speaker.

Additionally, the determining of the position of the ear of the passenger sitting in the seat may include: calibrating a position of the ear of the passenger based on horizontal vibration among vibrations detected by the vibration sensor detecting the vibration of the seat. The calibrating of the position of the ear of the passenger based on horizontal vibration among vibrations detected by the vibration sensor configured to detect the vibration of the seat may include: calibrating the position of the ear of the passenger in the left direction when the direction of vibration detected by the vibration sensor is in the left direction, and calibrating the position of the ear of the passenger in the right direction when the direction of vibration detected by the vibration sensor is in the right direction. The method may further include turning off the output of the headrest speaker when the position of the ear of the passenger does not change for the predetermined time.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
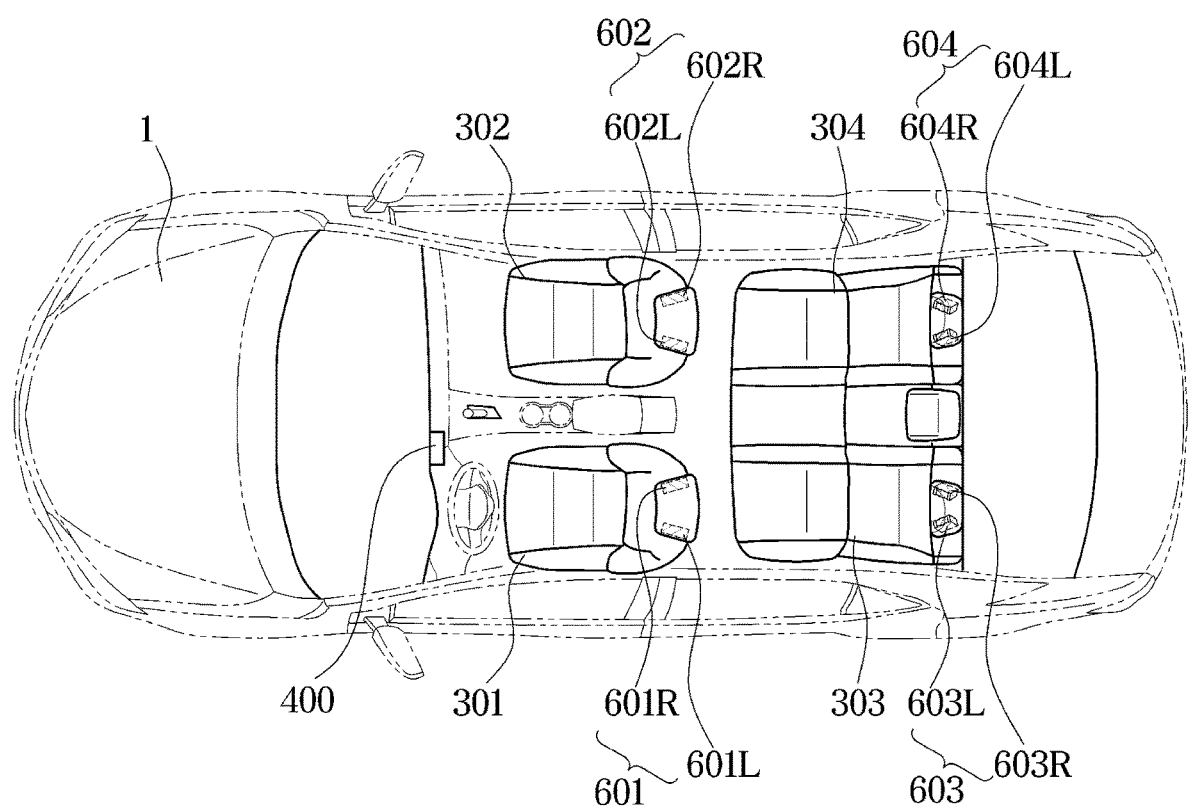
FIG. 1 is a perspective diagram schematically showing the appearance of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to various exemplary embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In the following description, like reference numerals refer to like elements throughout the specification. This specification does not describe all elements of the embodiments, and in the Field of the Disclosure to which an exemplary embodiment of the present disclosure pertains, there is no overlap between the general contents or the embodiments. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it may be directly or indirectly connected to the other element, wherein the indirect connection includes "connection via a wireless communication network". Further, when a part "includes" or "comprises" an element, unless there is a particular description contrary thereto, the part may further include other elements, not excluding the other elements.

The terms first, second, etc. are used to distinguish one component from another component, and the component is not limited by the terms described above. An expression used in the singular encompasses the expression of the plural, unless it has a clearly different meaning in the context. The reference numerals used in operations are used for descriptive convenience and are not intended to describe the order of operations and the operations may be performed in a different order unless otherwise stated.

Hereinafter, exemplary embodiments of the present disclosure will be described with reference to the accompanying drawings. FIG. 1 is a perspective diagram schematically showing the appearance of a vehicle according to an exemplary embodiment, and FIG. 2 is an enlarged diagram of a seat of a vehicle according to an exemplary embodiment.

For convenience of description below, as shown in FIG. 1, in general, the direction in which the vehicle 1 moves forward is called forward, and the left and right directions are distinguished based on the front. In addition, the floor direction with respect to the vehicle 1 is called a vertical direction, and a direction parallel to the ground is defined as a horizontal direction.

Figure 2:
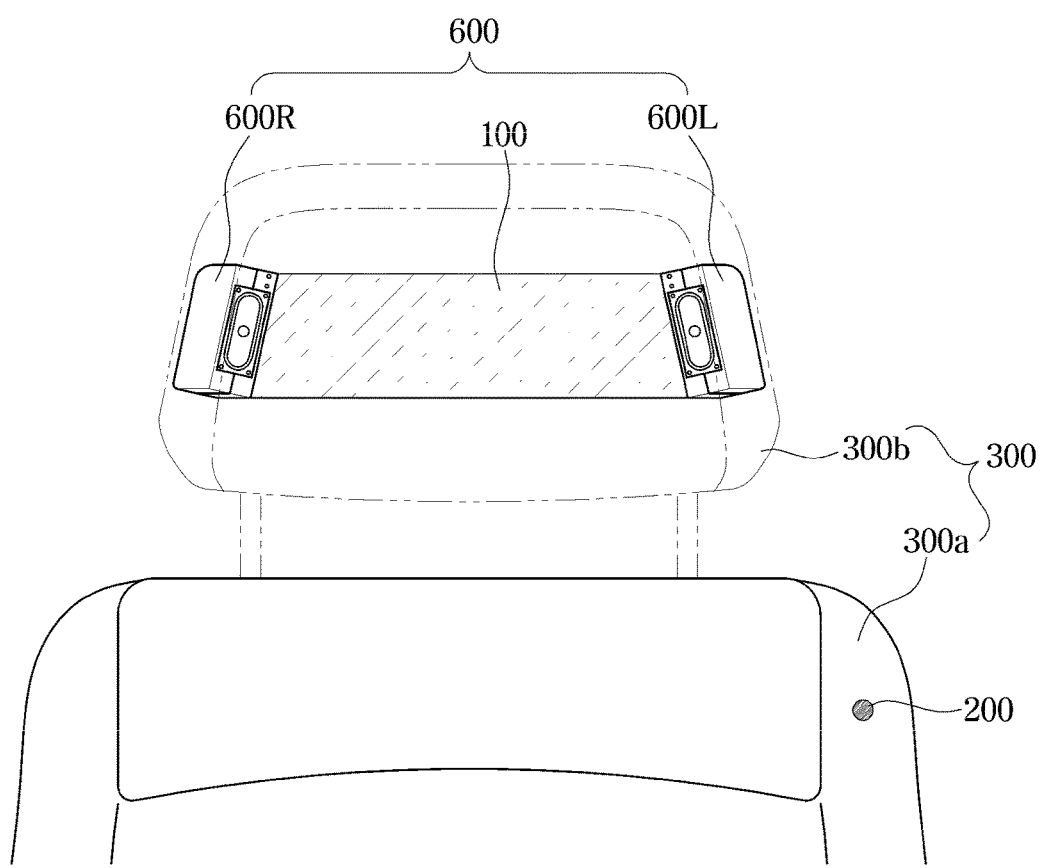
FIG. 2 is an enlarged diagram of a seat of a vehicle according to an exemplary embodiment.

Referring to FIGS. 1 and 2, the vehicle 1 may include at least one seat 300, a headrest speaker 600 provided on the headrest 300b of at least one seat 300, a pressure sensor 100 provided on the headrest (300b) and configured to measure the force applied to the headrest 300b, a vibration sensor 200 provided in the seat 300 and configured to detect the vibration of the seat 300, and a camera 400 configured to acquire the image of the passenger inside the vehicle 1.

The at least one seat 300 may include a driver's seat 301, an auxiliary seat 302, a rear seat 303 of the driver's seat, and a rear seat 304 of the auxiliary seat, and the passenger may refer to a person sitting in any one of the driver's seat 301, the auxiliary seat 302, the rear seat 303 of the driver's seat, and the rear seat 304 of the auxiliary seat. The number or shape of the at least one seat 300 may be different based on the type of the vehicle 1.

Each seat 300 may include a backrest 300a that supports a passenger's body and a headrest 300b that supports a passenger's head. The headrest speaker 600 may include a left speaker 600L provided on the left side of the headrest 300b to output sound, and a right speaker 600R provided on the right side of the headrest 300b to output sound. The headrest speaker 600 may be configured to output music according to a control signal of the controller 500, output a sound of a video, or output a sound signal of a navigation device or an AVN device.

For example, a first headrest speaker 601 may be provided in the driver's seat 301, and the first headrest speaker 601 may include a first left speaker 601L and a first right speaker 601R. A second headrest speaker 602 may be provided in the auxiliary seat 302, and the second headrest speaker 602 may include a second left speaker 602L and a second right speaker 602R. Similarly, a third headrest speaker 603 may be provided in the rear seat 303 of the driver's seat, and the third headrest speaker 603 may include a third left speaker 603L and a third right speaker 603R. In addition, a fourth headrest speaker 604 may be provided in the back seat 304 of the auxiliary seat, and the fourth headrest speaker 604 may include a fourth left speaker 604L and a fourth right speaker 604R.

Each of the headrest speakers 600 may be configured to output the same sound or may be configured to output different sounds. For example, the second headrest speaker 602 of the passenger seat 320 may be configured to output music, and the first headrest speaker 601 of the driver's seat 301 may be configured to output sound of the navigation device. Each seat 300 may include a pressure sensor 100 configured to measure the force applied to the headrest 300b. The pressure sensor 100 may include all regions in the horizontal direction of the headrest 300b, and may be configured to acquire information about an action point of a force applied to the headrest 300b.

As the pressure sensor 100, all types of sensors configured to measure the force applied to the headrest 300b may be employed. In addition, a vibration sensor 200 configured to measure vibration of the seat 300 may be provided in each seat 300. As the vibration sensor 200, all types of sensors configured to detect vibration of the seat 300 may be employed. Specifically, the vibration sensor 200 may be configured to measure the direction and intensity of vibration applied to the seat 300.

The camera 400 may refer to any configuration capable of acquiring an image of a passenger. For example, the camera 400 may employ a CMOS image sensor or a CCD image sensor. At least one camera 400 may be provided within the vehicle 1, and it may be possible to acquire all images of the passengers riding in each seat 300.

Figure 3:
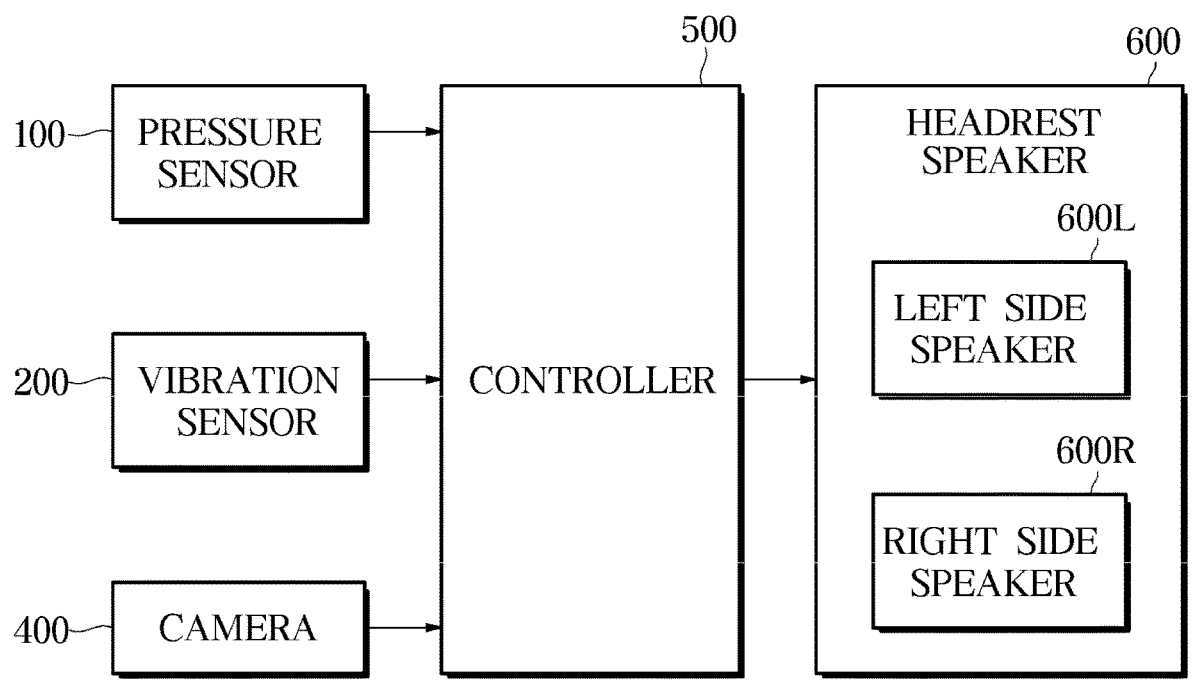
FIG. 3 is a control block diagram of a vehicle according to an exemplary embodiment.

FIG. 3 is a control block diagram of a vehicle according to an exemplary embodiment. Referring to FIG. 3, the pressure sensor 100 may be configured to transmit information regarding the force measured by the pressure sensor 100 to the controller 500. For example, the pressure sensor 100 may be configured to transmit information regarding the action point of the force measured by the pressure sensor 100 to the controller 500.

The vibration sensor 200 may be configured to detect the vibration of the seat 300 and transmit the sensed information to the controller 500. For example, the vibration sensor 200 may be configured to transmit information regarding the direction, intensity, etc. of vibration applied to the seat 300 to the controller 500. The camera 400 may be configured to acquire an image of the passenger and transfer the acquired image to the controller 500. The controller 500 may be configured to adjust the output of the headrest speaker 600 based on information obtained from the pressure sensor 100 and/or the vibration sensor 200 and/or the camera 400.

Specifically, the controller 500 may be configured to adjust the output intensity of the left speaker 600L and the right speaker 600R of the headrest speaker 600 differently from each other. For this, the controller 500 may include at least one memory in which a program for performing the above-described operations and operations described below is stored, and at least one processor for executing the stored program. When the controller 500 includes a plurality of memories and a plurality of processors, the plurality of memories and the plurality of processors may be directly connected to one chip or may be physically separated.

The pressure sensor 100, the vibration sensor 200, the camera 400, the controller 500, and the headrest speaker 600 according to an exemplary embodiment perform CAN (Controller Area Network) communication with each other to transmit respective information. In addition, each information may be transmitted by performing wired communication. For example, a communication network including a body network, a multimedia network, and a chassis network is configured in the vehicle 1 for control of various electric loads mounted on the vehicle 1 and communication between various electric loads, and each network separated from each other may be connected by the controller 500 to transmit and receive CAN (Controller Area Network) communication messages.

The configuration of the vehicle 1 according to one exemplary embodiment, and the operation and structure of each configuration have been described above. Hereinafter, a control method of the vehicle 1 using various configurations of the vehicle 1 will be described in detail.

Figure 4:
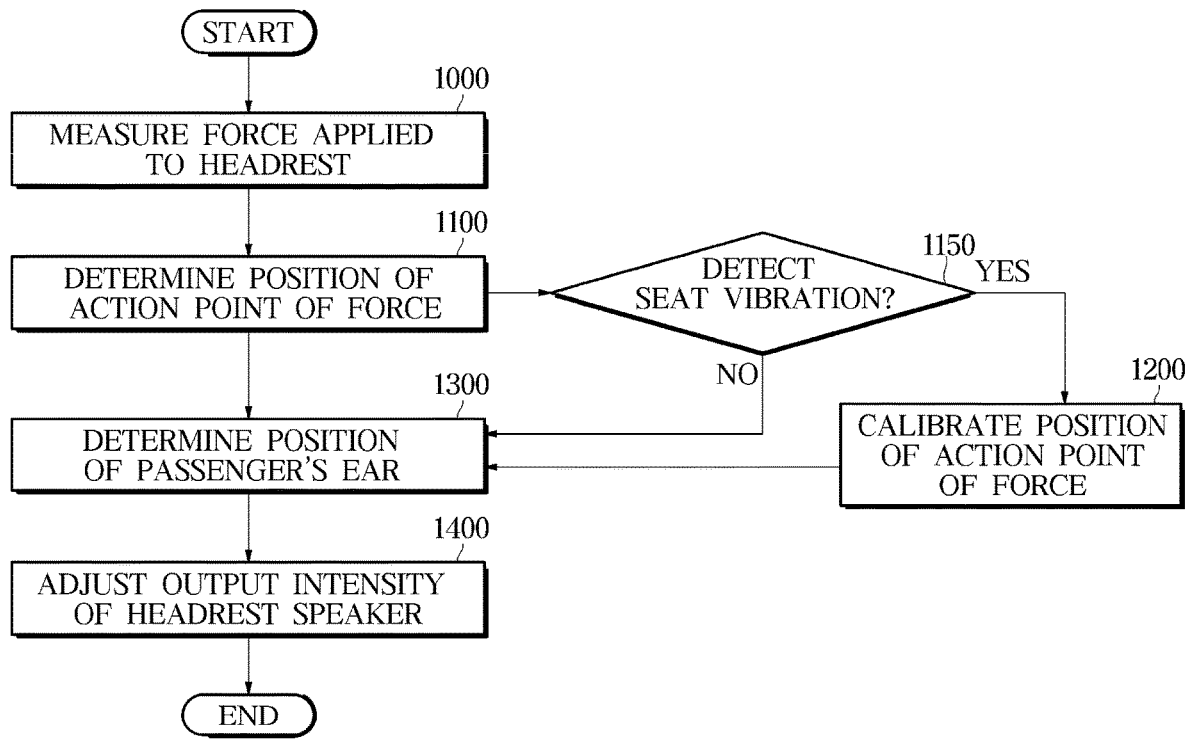
FIG. 4 is a flowchart of a method for controlling a vehicle according to an exemplary embodiment.
Figure 5:
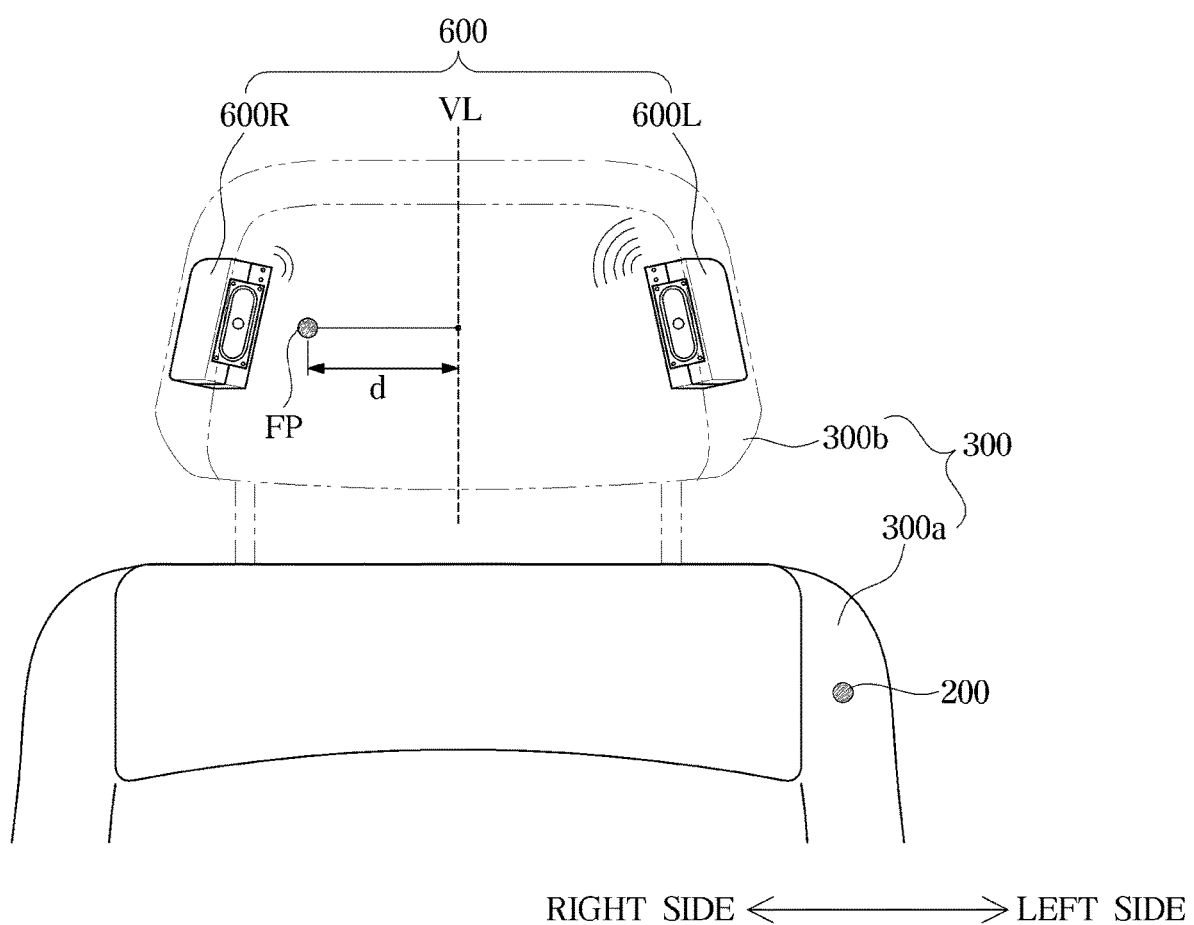
FIG. 5 is a diagram for explaining a process of controlling the output of the headrest speaker based on the action point of the force measured by the pressure sensor according to an exemplary embodiment.
Figure 6:
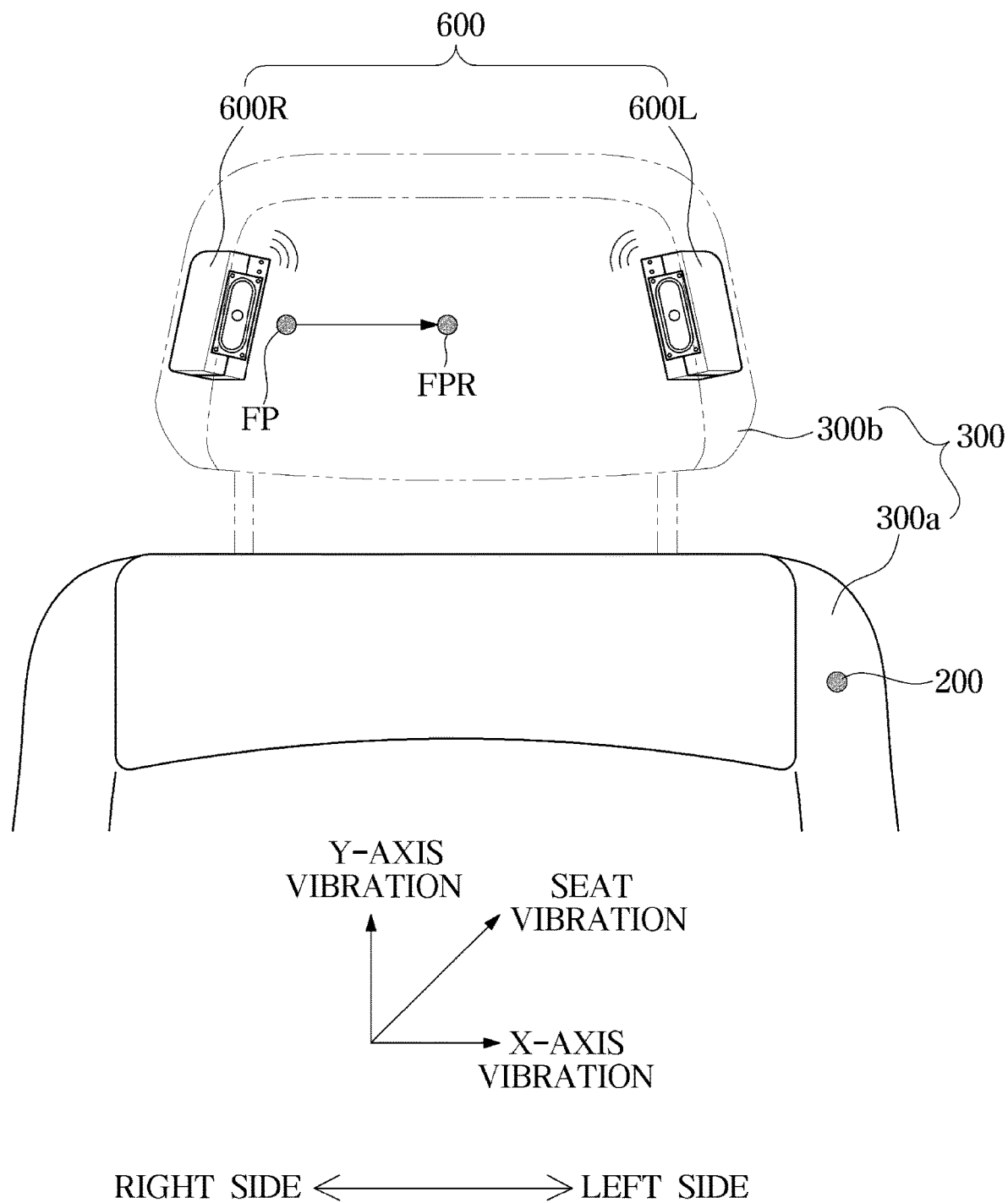
FIG. 6 is a diagram for explaining a process of calibrating the output of the headrest speaker based on the vibration measured by the vibration sensor according to an exemplary embodiment.

FIG. 4 is a flowchart of a method for controlling a vehicle according to an exemplary embodiment. FIG. 5 is a diagram for explaining a process of controlling the output of the headrest speaker based on the action point of the force measured by the pressure sensor according to an exemplary embodiment. FIG. 6 is a diagram for explaining a process of calibrating the output of the headrest speaker based on the vibration measured by the vibration sensor according to an exemplary embodiment.

Referring to FIGS. 4 to 6, the pressure sensor 100 may be configured to measure the force applied to the headrest 300b and transmit information regarding the force applied to the headrest 300b to the controller 500 (1000). The controller 500 may be configured to determine the position of the action point (FP) of the force measured by the pressure sensor 100 (1100). When the vibration of the seat 300 is not detected (1150), the controller 500 may be configured to determine the position of the passenger's ear based on the position of the action point (FP) of the force measured by the pressure sensor 100 (1300).

Referring to FIG. 5, when the action point FP of the force measured by the pressure sensor 100 is located on the right side with respect to the vertical line VL passing through the center of the headrest 300b, the position of the passenger's ear may be determined to be biased to the right. Thereafter, the controller 500 may be configured to adjust the output intensity of the headrest speaker 600 based on the position of the passenger's ear (1400). Specifically, when the action point of the force measured by the pressure sensor 100 is located on the right side based on the vertical line VL passing through the center of the headrest 300b, it may be determined that the position of the passenger's ear is biased to the right, and the controller 500 may be configured to reduce the output intensity of the right speaker 600R of the headrest speaker 600 and increase the output intensity of the left speaker 600L of the headrest speaker 600.

Conversely, when the action point of the force measured by the pressure sensor 100 is located on the left side based on the vertical line VL passing through the center of the headrest 300b, it may be determined that the position of the passenger's ear is biased to the left, and the controller 500 may be configured to reduce the output intensity of the left speaker 600L of the headrest speaker 600 and increase the output intensity of the right speaker 600R of the headrest speaker 600.

As described above, according to the control method of the vehicle according to an exemplary embodiment, the output strength of the speaker where the passenger's ear is located close may be decreased, and the output strength of the speaker where the passenger's ear is located far may be increased, and thus, the passenger may listen to the sound more smoothly and naturally. The controller 500 may be configured to determine the amount of change in output intensity of the left speaker 600L or the right speaker 600R proportional to the distance between the action point FP of the force measured by the pressure sensor 100 and the vertical line VL passing through the center of the headrest 300b.

For example, referring to FIG. 5, as the distance d between the action point FP of the force measured by the pressure sensor 100 and the vertical line VL increases, the controller 500 may be configured to increase the output intensity of the right speaker 600R. The output intensity of the left speaker 600L may be further increased. Conversely, assuming that the action point (FP) of the force measured by the pressure sensor 100 is on the left with respect to the vertical line (VL), the controller 500 may be configured to increase the distance between the action point (FP) of the force and the vertical line (VL). The output intensity of the speaker 600R may be further increased, and the output intensity of the left speaker 600L may be further reduced.

When the output intensity of the headrest speaker 600 is adjusted based on the force measured by the pressure sensor 100 as described above, when a sudden vibration is applied to the seat 300, a sudden change in speaker output may occur. Accordingly, the vibration sensor 200 provided on the seat 300 may be configured to detect vibration of the seat 300 (1150). When the vibration of the seat 300 is detected (YES in 1150), the controller 500 may be configured to calibrate the position of the action point of the force measured by the pressure sensor 100 based on the horizontal vibration among the vibrations detected by the vibration sensor 200 (1200).

Specifically, when the direction of the vibration detected by the vibration sensor 200 is the left direction, the controller 500 may be configured to calibrate the position of the action point of the force measured by the pressure sensor 100 in the left direction, and when the direction of vibration sensed by the vibration sensor 200 is in the right direction, the position of the action point of the force measured by the pressure sensor 100 may be calibrated in the right direction.

Referring to FIG. 6, the vibration of the seat 300 detected by the vibration sensor 200 is in the left direction. At this time, the position of the seat 300 may be moved in the left direction momentarily, and accordingly, the direction in which the head of the passenger presses the headrest 300b may be moved in the right direction. In other words, even if the position of the head of the passenger does not change when the vibration of the seat 300 detected by the vibration sensor 200 is in the left direction, the output intensity of the headrest speaker 600 may be changed by moving the position of the action point of the force measured by the pressure sensor 100 in the right direction.

To prevent the output intensity of the headrest speaker 600 from being changed according to the vibration of the seat 300 as above, when the vibration of the seat 300 detected by the vibration sensor 200 is in the left direction, the controller 500 may be configured to calibrate the position of the action point FP of the force measured by the pressure sensor 100 to the left, and the calibrated force action point (FPR). The controller 500 may be configured to determine the position of the passenger's ear based on the position of the calibrated force acting point (FPR), and adjust the output intensity of the headrest speaker 600 based on the passenger's ear position (1400).

The controller 500 may also be configured to determine a calibration amount of the position of the action point FP of the force measured by the pressure sensor 100 in proportion to the intensity of the vibration sensed by the vibration sensor 200. Specifically, as the intensity of the horizontal vibration detected by the vibration sensor 200 increases, the controller 500 may be configured to move the position of the action point FP of the force in the direction of vibration. In addition, when the horizontal vibration in the vibration sensor 200 is continuously detected for a preset period of time, the controller 500 may be configured to set the position of the action point FP of the force measured by the pressure sensor 100 as the center of the headrest 300b.

When the vehicle 1 is driving on a bumpy road such as a dirt road, if the output of the headrest speaker 600 continuously changes according to the vibration detected by the vibration sensor 200, it may cause inconvenience to the passenger. Therefore, the output of the headrest speaker 600 may be maintained constant when the vehicle 1 is driving on a bumpy road. Accordingly, the preset period of time may be set in advance as a time for which the vehicle 1 may be determined to be driving on a bumpy road such as an unpaved road. For example, the preset time may be set to about 2 seconds. Although not shown in FIG. 4, the controller 500 may be configured to turn off the output of the headrest speaker 600 when the position of the action point of the force measured by the pressure sensor 100 does not change for a preset period of time.

If the position of the action point of the force measured by the pressure sensor 100 does not change for a certain period of time, it is highly likely that the passenger has fallen asleep, and thus, to protect the passenger's hearing, the output of the headrest speaker 600 may be turned off. At this time, the preset period of time may be set to a time long enough to reasonably think that the passenger has fallen asleep. For example, the preset time may be set to about 10 minutes.

Figure 7:
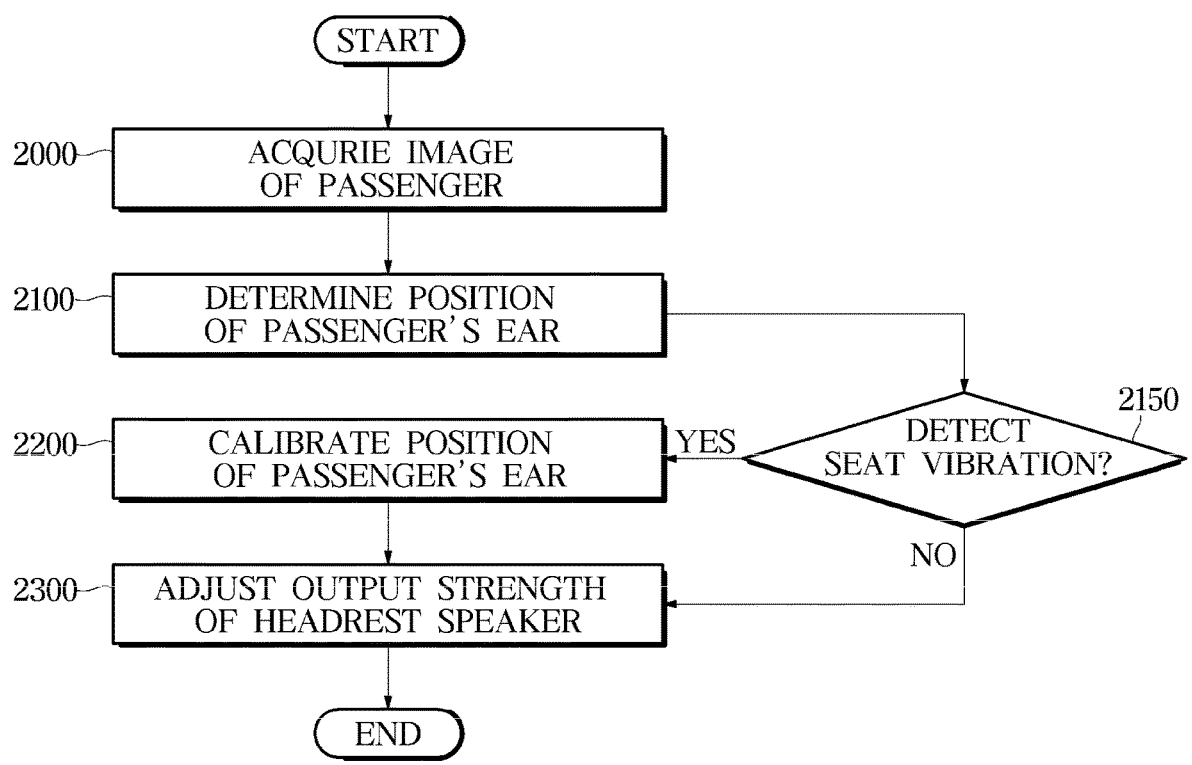
FIG. 7 is a flowchart of a method for controlling a vehicle according to another exemplary embodiment.
Figure 8:
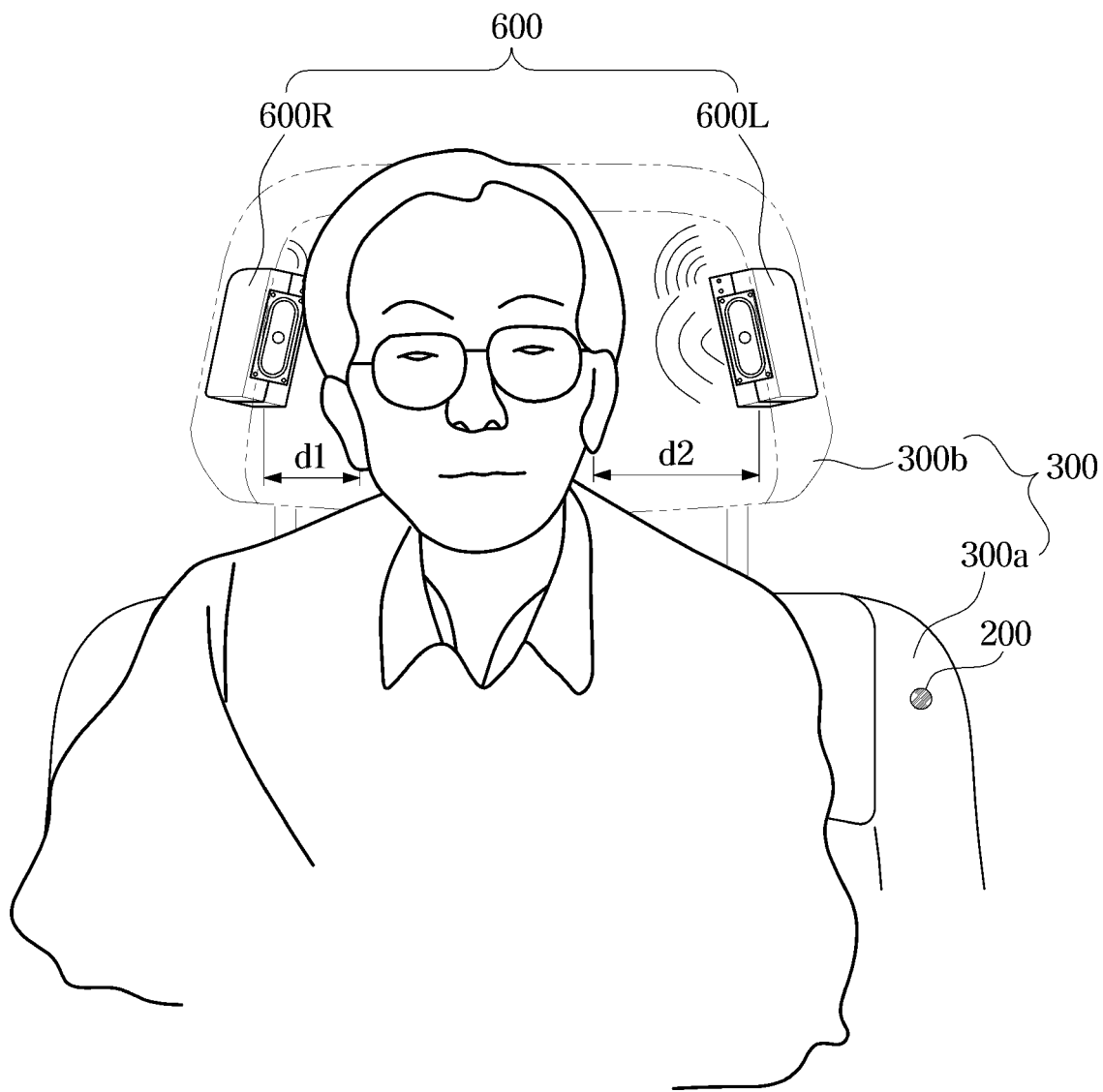
FIG. 8 is a diagram showing an image of a passenger acquired by a camera according to an exemplary embodiment.
Figure 9:
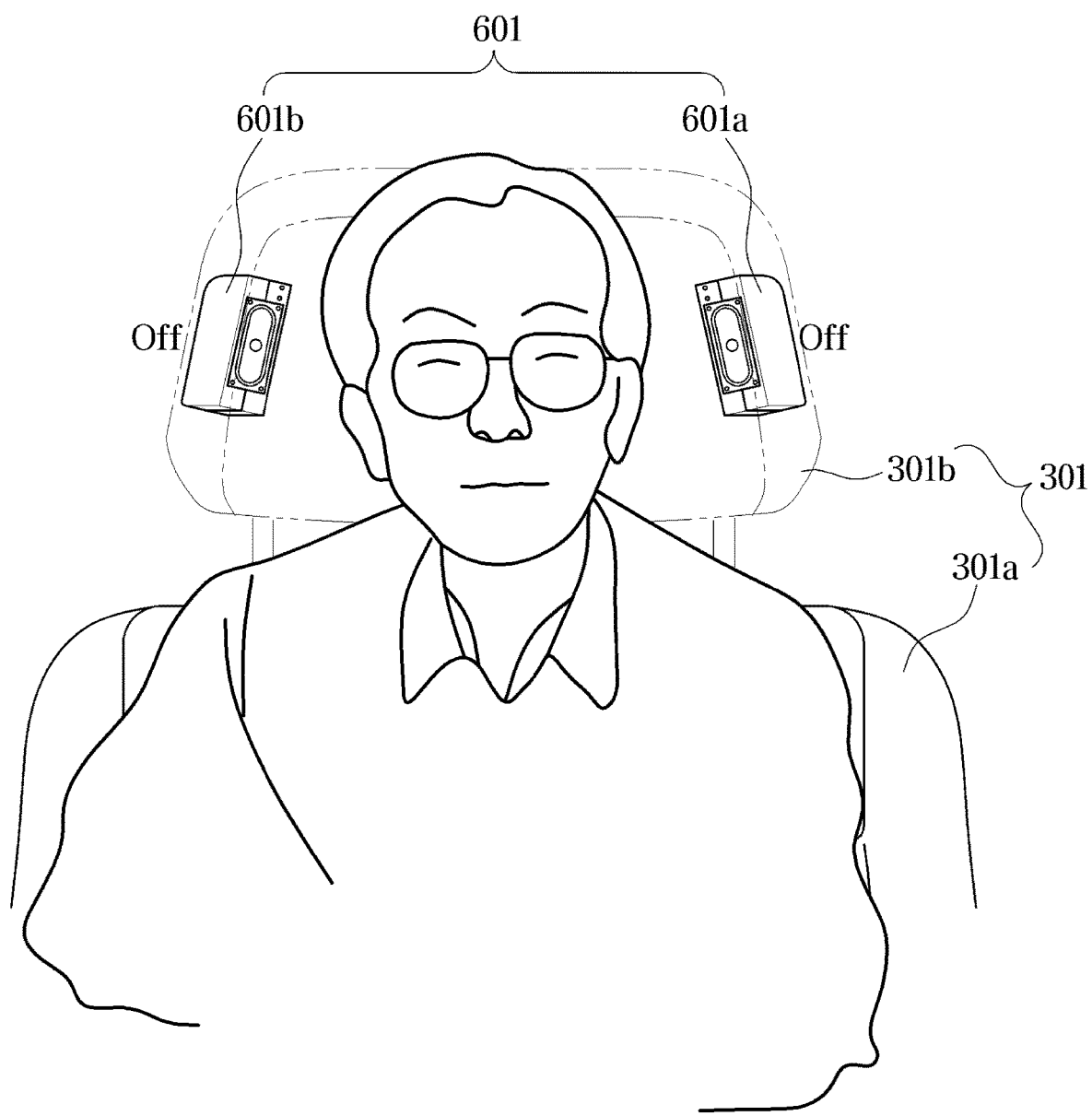
FIG. 9 is a diagram showing a situation in which the output of the headrest speaker is off according to an exemplary embodiment.

The control method of the vehicle 1 according to an exemplary embodiment has been described above with reference to FIGS. 4 to 6. Hereinafter, a control method of the vehicle 1 according to another exemplary embodiment will be described with reference to FIGS. 7 to 9. FIG. 7 is a flowchart of a method for controlling a vehicle according to another exemplary embodiment. FIG. 8 is a diagram showing an image of a passenger acquired by a camera according to an exemplary embodiment. FIG. 9 is a diagram showing a situation in which the output of the headrest speaker is off according to an exemplary embodiment.

Referring to FIG. 7, the camera 400 may be configured to acquire an image of a passenger sitting in the seat 300. Specifically, image data regarding the face of the passenger may be acquired (2000). The controller 500 may be configured to recognize the passenger's ear based on the image of the passenger obtained from the camera 400 and determine the position of the passenger's ear (2100). When the vibration of the seat 300 is not detected (NO in 2150), the controller 500 may be configured to adjust the output intensity of the left speaker 600L and the right speaker 600R of the headrest speaker 600 based on the position of the passenger's ear. (2300).

Specifically, the controller 500 may be configured to decrease the output intensity of the left speaker 600L as the passenger's ear is closer to the left speaker 600L, and increase the output intensity of the left speaker 600L as the passenger's ear is farther from the left speaker 600L. At this time, the controller 500 may be configured to determine the output intensity of the left speaker 600L in proportion to the distance between the passenger's ear and the left speaker 600L. For example, the smaller the distance between the left speaker 600L and the passenger's ear, the more the output intensity may be reduced. The greater the distance between the left speaker 600L and the passenger's ear, the greater the output intensity.

Conversely, the controller 500 may be configured to decrease the output intensity of the right speaker 600R as the passenger's ear is closer to the right speaker 600R, and increase the output intensity of the right speaker 600R as the passenger's ear is farther from the right speaker 600R. At this time, the controller 500 may be configured to determine the output intensity of the right speaker 600R in proportion to the distance between the passenger's ear and the right speaker 600R. For example, the smaller the distance between the right speaker 600R and the passenger's ear, the more the output intensity may be reduced. The greater the distance between the right speaker 600R and the passenger's ear, the greater the output intensity.

Referring to FIG. 8, the distance d1 between the passenger's right ear and the right speaker 600R is less than the distance d2 between the passenger's left ear and the left speaker 600L. Referring to FIG. 8, the controller 500 may be configured to decrease the output intensity of the right speaker 600R and increase the output intensity of the left speaker 600L.

As described with reference to FIG. 4, when the vibration of the seat 300 is detected (YES in 1150), the controller 500 may be configured to calibrate the position of the passenger's ear based on the horizontal vibration among the vibrations detected by the vibration sensor 200 (2200). Specifically, if the direction of vibration detected by the vibration sensor 200 is the left direction, the controller 500 may be configured to calibrate the position of the passenger's ear in the left direction. If the direction of vibration detected by the vibration sensor 200 is in the right direction, the position of the passenger's ear may be calibrated in the right direction.

In addition, the controller 500 may be configured to determine a calibration amount of the position of the passenger's ear in proportion to the intensity of vibration detected by the vibration sensor 200. In addition, when the controller 500 continuously detects the horizontal vibration in the vibration sensor 200 for a preset period of time, the position of the passenger's ear may be calibrated such that the distance between the right speaker 600R and the passenger's right ear is equal to the distance between the left speaker 600L and the passenger's left ear.

As described above, when the vehicle 1 is being driven on a bumpy road such as a dirt road, if the output of the headrest speaker 600 continuously changes according to the vibration detected by the vibration sensor 200, it may cause inconvenience to the passenger. Accordingly, the output of the headrest speaker 600 may be maintained constant when the vehicle 1 is being driven on a bumpy road. Thereafter, the controller 500 may be configured to adjust the output intensity of the headrest speaker 600 based on the calibrated position of the passenger's ear (2300).

Although not illustrated in FIG. 7, the controller 500 may be configured to sense the state of the passenger's eyes based on the image of the passenger, and turn off the output of the headrest speaker 600 when the passenger's eyes are closed for a predetermined period of time. As shown in FIG. 9, the eyes of the passengers are closed, and if the passenger's eyes are closed for a certain period of time, since there is a high probability that the passenger is asleep, the controller 500 may be configured to protect the passenger's hearing by turning off the output of the headrest speaker 600.

The control method of the vehicle 1 according to another exemplary embodiment has been described above with reference to FIGS. 7 to 9. The control method of the vehicle 1 shown in FIG. 4 and the control method of the vehicle 1 shown in FIG. 7 are not mutually exclusive, and the output of the headrest speaker 600 according to the exact position and state of the passenger's ears may be used interchangeably to adjust the intensity.

In other words, the controller 500 may be configured to more accurately determine the position of the passenger's ear based on information obtained from both the pressure sensor 100, the camera 400, and the vibration sensor 200. For example, even if the position of the action point of the force measured by the pressure sensor 100 is biased to one side, based on the image of the passenger obtained from the camera 400, if the position of the passenger's ear has not changed significantly, the output of the headrest speaker 600 may be adjusted based on the image of the passenger obtained from the camera 400. In addition, even if the position of the action point of the force measured by the pressure sensor 100 does not change for a preset period of time, based on the image of the passenger obtained from the camera 400, if the passenger's eyes are not closed, the headrest speaker 600 may not be turned off.

As described above, the disclosed exemplary embodiments have been described with reference to the accompanying drawings. Those skilled in the art will understand that the present disclosure may be implemented in a form different from the disclosed exemplary embodiments without changing the technical spirit or essential features of the present disclosure. The disclosed exemplary embodiments are exemplary and should not be construed as limiting.

On the other hand, the disclosed exemplary embodiments may be implemented in a form of a recording medium for storing instructions executable by a computer. Instructions may be stored in a form of program code and, when executed by a processor, may generate a program module to perform the operations of the disclosed exemplary embodiments. The recording medium may be implemented as a non-transitory computer-readable recording medium.

The non-transitory computer-readable recording medium includes all types of recording media in which instructions which may be decoded by a computer. For example, there may be read only memory (ROM), random access memory (RAM), a magnetic tape, a magnetic disk, a flash memory, an optical data storage device, and the like.

As described above, the disclosed exemplary embodiments have been described with reference to the accompanying drawings. Although exemplary embodiments of the present disclosure have been shown and described, it would be appreciated by those skilled in the art that changes may be made to these embodiments without departing from the principles and spirit of the present disclosure, the scope of which is defined in the claims and their equivalents.

By adjusting the output intensity of the headrest speaker according to the position of the passenger's ear, there is an effect that the passenger may more effectively listen to the sound. In addition, when there is no movement of the passenger, the output of the speaker may be turned off to protect the passenger's hearing.

What is claimed is:

1. A vehicle, comprising:
   a headrest speaker including a left-side speaker provided on the left-side of the headrest of a seat inside the vehicle to output sound and a right-side speaker provided on the right-side of the headrest to output sound;
   a pressure sensor configured to measure a force applied to the headrest; and
   a controller configured to adjust an output intensity of the left speaker and the right speaker based on an action point of the force measured by the pressure sensor,
   wherein the controller is configured to reduce the output intensity of the speaker provided in a first direction among the left speaker and the right speaker, and increase the output intensity of the speaker provided in a second direction opposite to the first direction among the left speaker and the right speaker when the action point of the force measured by the pressure sensor is located in the first direction based on a vertical line passing through a center of the headrest.

2. The vehicle according to claim 1, wherein the controller is configured to determine an amount of change in the output intensity of the left speaker or the right speaker in proportion to a distance between the action point of the force measured by the pressure sensor and the vertical line passing through the center of the headrest.

3. The vehicle according to claim 1 further comprising:

a vibration sensor configured to detect a vibration of the seat;

wherein the controller is configured to calibrate a position of the action point measured by the pressure sensor based on a horizontal vibration among the vibrations detected by the vibration sensor.

4. The vehicle according to claim 3, wherein the controller is configured to calibrate the position of the action point of the force measured by the pressure sensor in the left direction when a vibration direction detected by the vibration sensor is in the left direction, and calibrate the position of the action point of the force measured by the pressure sensor in the right direction when a vibration direction detected by the vibration sensor is in the right direction.

5. The vehicle according to claim 3, wherein the controller is configured to calibrate the position of the action point of the force measured by the pressure sensor to the center of the headrest when the vibration sensor continuously detects the vibration in the horizontal direction for a predetermined time.

6. The vehicle according to claim 1, wherein the controller is configured to turn off the output of the headrest speaker in response to determining that the position of the action point of the force measured by the pressure sensor does not change for a predetermined period of time.

7. A vehicle, comprising:
a headrest speaker including a left-side speaker provided on the left-side of the headrest of a seat inside the vehicle to output sound and a right-side speaker provided on the right-side of the headrest to output sound;
a camera configured to acquire an image of a passenger sitting on a seat of the vehicle; and
a controller configured to determine a position of the passenger's ear based on the image acquired from the camera, and adjust an output intensity of the left speaker and the right speaker based on the position of the passenger's ear,
wherein the controller is configured to reduce the output intensity of the speaker when a left ear or a right ear of the passenger is closer to the left speaker or the right speaker, and increase the output intensity of the speaker when the left ear or the right ear of the passenger is farther from the left speaker or the right speaker.

8. The vehicle according to claim 7, wherein the controller is configured to determine the output intensity of the left speaker or the right speaker in proportion to a distance between the left ear or the right ear of the passenger and the left speaker or the right speaker.

9. The vehicle according to claim 7 further comprising:
a vibration sensor configured to detect a vibration of the seat; and
wherein the controller is configured to calibrate a position of the passenger's ear based on a horizontal vibration among the vibrations detected by the vibration sensor.

10. The vehicle according to claim 9, wherein the controller is configured to calibrate the position of the passenger's ear in the left direction when a vibration direction detected by the vibration sensor is in the left direction, and calibrate the position of the passenger's ear in the right direction when a vibration direction detected by the vibration sensor is in the right direction.

11. The vehicle according to claim 9, wherein the controller is configured to calibrate the position of the passenger's ear so that the distance between the right speaker and the passenger's right ear is equal to the distance between the left speaker and the passenger's left ear when the horizontal vibration is continuously detected by the vibration sensor for a preset period of time.

12. The vehicle according to claim 7, wherein the controller is configured to detect the passenger's eye based on the image of the passenger, and turn off the output of the headrest speaker in response to determining that the passenger's eye is closed for a predetermined period of time.

13. A control method of a vehicle including a headrest speaker including a left-side speaker provided on the left-side of the headrest of a seat inside the vehicle to output sound and a right-side speaker provided on the right-side of the headrest to output sound, the method comprising:
determining, by a controller, a position of an ear of a passenger sitting in a seat of the vehicle; and
adjusting, by the controller, an output intensity of the left speaker and the right speaker based on the position of the passenger's ear, wherein:
the determining of the position of the ear of the passenger includes:
determining the position of the passenger's ear sitting in the seat based on an action point of force measured by a pressure sensor measuring force applied to the headrest, and
the adjusting of the output intensity of the left speaker and the right speaker based on the position of the passenger's ear includes:
reducing the output intensity of the speaker provided in a first direction among the left speaker and the right speaker; and
increasing the output intensity of the speaker provided in a second direction opposite to the first direction among the left speaker and the right speaker when the action point of the force measured by the pressure sensor is located in the first direction based on a vertical line passing through a center of the headrest.

14. A control method of a vehicle including a headrest speaker including a left-side speaker provided on the left-side of the headrest of a seat inside the vehicle to output sound and a right-side speaker provided on the right-side of the headrest to output sounds, the method comprising:
determining, by a controller, a position of an ear of a passenger sitting in a seat of the vehicle, and
adjusting, by the controller, an output intensity of the left speaker and the right speaker based on the position of the passenger's ear, wherein:
the determining of the position of the ear of the passenger sitting in the seat includes:
determining the position of the ear of the passenger based on the image acquired by a camera configured to acquire image of the passenger sitting in the seat; and
the adjusting of the output intensity of the left speaker and the right speaker based on the position of the ear of the passenger includes:
reducing the output intensity of the speaker when the left or right ear of the passenger is closer to the left speaker or the right speaker; and
increasing the output intensity of the speaker when the left or right ear of the passenger is farther from the left speaker or the right speaker.

15. The method according to claim 13 or 14, wherein determining the position of the ear of the passenger sitting in the seat includes: calibrating a position of the ear of the passenger based on horizontal vibration among vibrations detected by the vibration sensor configured to detect the vibration of the seat.

16. The method according to claim 15, wherein the calibrating of the position of the ear of the passenger based on horizontal vibration among vibrations detected by the vibration sensor detecting the vibration of the seat includes:
   calibrating the position of the ear of the passenger in the left direction when the direction of vibration detected by the vibration sensor is in the left direction; and
   calibrating the position of the ear of the passenger in the right direction when the direction of vibration detected by the vibration sensor is in the right direction.

17. The method according to claim 13 or 14, further comprising:
   turning off, by the controller, the output of the headrest speaker in response to determining that the position of the ear of the passenger does not change for a predetermined period of time.

* * * * *